United States Patent [19]

Fischer et al.

[11] 4,121,664

[45] Oct. 24, 1978

[54] BIODEGRADABLE FOAMING AGENT IN DRILLING AND WORKOVER OPERATIONS

[75] Inventors: Paul W. Fischer, Whittier; David S. Pye, Brea, both of Calif.

[73] Assignee: Union Oil Company of California, Brea, Calif.

[21] Appl. No.: 842,497

[22] Filed: Oct. 17, 1977

[51] Int. Cl.$^2$ ............... E21B 21/00; C09K 7/02; C09K 7/08
[52] U.S. Cl. ............... 166/309; 175/66; 175/69; 252/85 C
[58] Field of Search ............ 166/309, 312, 305 R; 175/66, 69, 71; 252/8.5 C

[56] References Cited

U.S. PATENT DOCUMENTS

| | | | |
|---|---|---|---|
| 2,870,990 | 1/1959 | Bergey | 175/66 |
| 3,174,929 | 3/1965 | Andersen | 166/309 X |
| 3,229,777 | 1/1966 | Rogers | 175/71 |
| 3,269,468 | 8/1966 | Phansalkar et al. | 175/71 |
| 3,394,768 | 7/1968 | Chocola | 175/69 |
| 3,486,560 | 12/1969 | Hutchison et al. | 175/69 |
| 3,529,668 | 9/1970 | Bernard | 166/273 |
| 3,995,705 | 12/1976 | Fischer et al. | 175/69 |
| 4,036,764 | 7/1977 | Fischer et al. | 252/8.5 C |

OTHER PUBLICATIONS

Swisher, "The Chemistry of Surfactant Biodegradation", *The Journal of the American Oil Chemists' Society,* vol. 40, Nov., 1963, pp. 648–656.

*Primary Examiner*—Stephen J. Novosad
*Assistant Examiner*—George A. Suchfield
*Attorney, Agent, or Firm*—Richard C. Hartman; Dean Sandford; Gerald L. Floyd

[57] ABSTRACT

A method for conducting foam drilling and workover operations in a bore hole penetrating a subterranean reservoir employing an aqueous solution of a biodegradable foaming agent composition containing about 0.1 to 1 part by weight of an N-fatty ethyl sulfate salt having the formula:

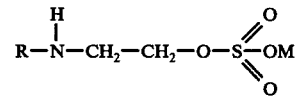

wherein R is a straight chain alkyl radical having from 10 to 16 carbon atoms and M is an alkali metal or ammonium cation, per part per weight of a fatty acid salt having the formula:

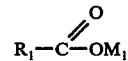

wherein $R_1$ is a straight chain alkyl radical having from 9 to 15 carbon atoms and $M_1$ is an alkali metal or ammonium cation. A particularly preferred foaming agent composition contains sodium 2-(N-lauryl) ethyl sulfate and sodium laurate.

12 Claims, No Drawings

BIODEGRADABLE FOAMING AGENT IN DRILLING AND WORKOVER OPERATIONS

BACKGROUND OF THE INVENTION

1. Field of the Invention

This invention relates to the drilling and workover of wells penetrating subterranean reservoirs, and more particularly to the drilling of such reservoirs with foam drilling fluid containing a biodegradable foaming agent.

2. Description of the Prior Art

It has long been conventional practice in the drilling of bore holes penetrating subterranean reservoirs to circulate a drilling fluid down the drill pipe and back up the bore hole annulus for the removal of debris and drill cuttings from the bore hole. Drilling fluid also serves to prevent sloughing in the bore hole during the drilling operation. Recently, air and gas have replaced conventional drilling fluids in the drilling of some bore holes, and have proved particularly beneficial in reservoirs wherein dense conventional drilling fluid would be lost to the reservoir. Additionally, air and gas have also provided longer bit life and higher rates of penetration in the drilling of bore holes.

However, in many reservoirs, water enters the bore hole from adjacent water-containing strata; and air and gas have proved unable to remove this water. In view of this problem, foams have been developed to remove both the cuttings and the water from these bore holes. Numerous foam compositions have been proposed and used. A suitable foam should be stable enough to withstand the rigors of circulation through the bore hole without appreciable breaking into its component parts so as to assure adequate removal of cuttings from the bore hole. At the same time, environmental considerations require that the foaming agent in a foam circulated out of a well and stored at the earth's surface biodegrades within a reasonable period of time to aid in its disposal. Previously used foams have not been able to completely satisfy the dual requirements of adequate stability during circulation and biodegradability upon storage.

Accordingly, a principal object of this invention is to prove a method of conducting foam drilling and workover operations in subterranean reservoirs.

Another object of the invention is to provide such a method employing a biodegradable foaming agent.

A further object of the invention is to provide such a method wherein the foam which is circulated through the well bore and then stored, subsequently breaks into its component parts.

A still further object of the invention is to provide such a method employing a foaming agent which is both stable during use and biodegradable during subsequent storage as a constituent of a foam.

Other objects, advantages and features of the invention will become apparent to those skilled in the art from the following description.

SUMMARY OF THE INVENTION

Briefly, this invention provides a method of conducting foam drilling and workover operations in subterranean reservoirs which employ a foam that is stable under operating conditions for a sufficient length of time to allow such operations to be conducted. However, the foaming agent subsequently biodegrades. The foam is formed by contacting a gas at elevated pressure with an aqueous solution containing about 0.1 to 1 part by weight of an N-fatty ethyl sulfate salt having the formula:

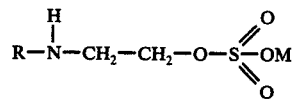

wherein R is a straight chain alkyl radical having from 10 to 16 carbon atoms and M is an alkali metal or ammonium cation, with sodium being preferred, per part per weight of a fatty acid salt having the formula:

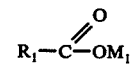

wherein $R_1$ is a straight chain alkyl radical having from 9 to 15 carbon atoms and $M_1$ is an alkali metal or ammonium cation, with sodium being preferred. After being circulated through the well bore, the foam, entrained cuttings and liquids are passed to a receptacle, such as a mud pit, where the foam collapses and the foaming agent present in the liquid phase biodegrades. The resulting degradation products are then disposed of. In some instances, when the mixture of foam, entrained cuttings and liquids is removed from the well, a portion of the cuttings is separated, such as by passing the mixture over a screen, before passing the mixture to the receptacle.

DETAILED DESCRIPTION OF THE INVENTION

In foam drilling and workover operations there is employed a foam having a volume that is large compared to the volume of the liquid components of the foam. It is desired that the foam remain stable during circulation through the well. After being circulated out of the well, the foam must be disposed of in some manner. Thus, it is desired that the foam break soon after circulation ceases yielding a gas that escapes into the atmosphere and a liquid phase which can be passed to sewage, injected into a subterranean reservoir, allowed to evaporate or otherwise disposed of. Some jurisdictions have environmental regulations which prohibit prolonged surface storage of solutions containing a foaming agent. Thus, there is employed in the method of this invention a biodegradable foaming agent which forms a foam which is stable under operating conditions but collapses or breaks within a reasonable length of time upon standing.

Biodegradability is defined as that property possessed by a material which is capable of being decomposed by certain bacteria or living organisms. The biodegradation of foaming agents by microorganisms derived from river water, activated sludge, sewage, soil or air proceeds by $\beta$-oxidation, methyl oxidation or aromatic oxidation to produce a product which is not a foaming agent. Biodegradation is measured by exposing the foaming agent or foam to the microorganisms and analyzing the system at intervals to determine such things as the disappearance of the test compound, the formation of degradation products or the uptake of oxygen. Biodegradability can be measured by well-known methods such as the river die-away method, the shake-flask method and the activated-sludge method.

The aqueous foaming agent solution employed in the method of this invention is an admixture of water and a foaming agent. The foaming agent composition contains about 0.1 to 1 part by weight of an N-fatty ethyl sulfate salt having the formula:

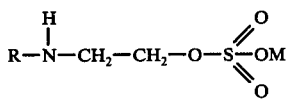

wherein R is a straight chain alkyl radical having from 10 to 16 carbon atoms and M is an alkali metal or ammonium cation, with sodium being preferred, per part per weight of a fatty acid salt having the formula:

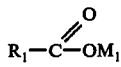

wherein $R_1$ is a straight chain alkyl radical having from 9 to 15 carbon atoms and $M_1$ is an alkali metal or ammonium cation, with sodium being preferred. Specifically, the fatty groups of R and $R_1$ can be n-nonyl, n-decyl, n-undecyl, n-dodecyl, n-tridecyl, n-tetradecyl, n-pentadecyl or n-hexadecyl. A particularly preferred foaming agent composition contains sodium 2-(N-lauryl) ethyl sulfate and sodium laurate.

The N-fatty ethyl sulfate salts can be prepared by any of several well-known processes. For example, by reacting sulfuric acid with a fatty ethanol amide.

The aqueous foaming solution is prepared by admixing the foaming agents in water, such that the solution contains about 0.016 to 2.5 percent by weight of the foaming agent mixture, preferably about 0.03 to 0.5 percent by weight, and more preferably about 0.3 percent by weight of the foaming agent composition the two components of the foaming agent composition can be added individually to water in any desired order, or mixed together and the resulting mixture added to water. The foaming agent composition can be premixed at the surface or the two foaming agent components and water injected down the well separately in any desired order, or in any desired combination, whereupon the foaming agent composition forms as the components pass down the well and mix. Optionally, other ingredients such as corrosion inhibitors and scale deposition inhibitors can be added to the foaming agent solution.

The gas which is used with the foaming agent solution to generate the foam can be nitrogen, natural gas, methane, butane, carbon dioxide, or air, with air being preferred. The foam itself will contain, measured at the existing bottom-hole pressure, about 90 to 99.5 volume percent of the gas, and correspondingly about 0.5 to 10 volume percent of the foaming agent solution.

The injection rates of the two fluids will be determined by the conditions existing in the bore hole, the desired velocity of the foam flowing up the bore hole annulus, and the size of the bore hole annulus. The relative rates of injection will be determined by the desired gas-liquid composition of the foam at the prevailing bottom-hole pressure. In most foam drilling operations, it is preferred that the velocity of the foam be in the range of from 80 to 600 feet per minute; however, lower velocities can be useful.

The foaming agent solution and gas can be injected separately at an elevated pressure through the drill pipe penetrating the subterranean reservoir and the foam generated by contact of the foaming agent solution and the gas caused to travel down the drill pipe and then up the bore hole annulus so that the foam carries the drill cuttings, liquids and other debris from the bottom of the bore hole to the surface of the earth. In a modification of this conventional mode, the foam can be preformed at the surface before injection into the bore hole. Alternatively, the two fluids can be injected simultaneously, but separately, down separate conduits and allowed to mix at the bottom of the hole. For example, in the drilling of a bore hole, the gas can be injected down a separate central pipe within the drill pipe, and the foaming agent solution can be injected down the annulus between the central pipe and the drill pipe. In some cases the gas can be injected down the annulus between the central pipe and the drill pipe, while the foaming agent solution is injected down the central pipe. The fluid injected down the central pipe will emerge from the drill pipe via ports in the drill bit. The fluid injected down the annulus will exit the drill pipe through perforations near the drill bit. It may be desired in conducting a foam drilling operation to inject the gas down the central pipe and the foaming agent solution down the annulus. This method reduces the loss of lubrication in the drill bit as a result of the detergent action of the foaming agent solution and also prevents the corrosion of the drill bit as a result of the direct contact of the foaming agent solution on the now lubricant-free drill bit surfaces.

When the foam is used in high-temperature reservoirs, sometimes it is desired to maintain sufficient pressure in the bore hole to prevent the liquid portion of the foam from flashing. For this reason, the top of the bore hole may be sealed so that the bore hole annulus does not directly communicate with the atmosphere; and the conduit at the surface for discharging the foam may be equipped with a valve for supplying the necessary back pressure to the bore hole.

After the foam is removed from the well, it is pumped or otherwise transported into a receptacle or container, for example, a mud pit or holding pond. There the foam is allowed to remain until the foam breaks or collapses and the foaming agent biodegrades. Bacteria or other living organisms can be added to the receptacle to speed up the biodegradation. The relatively small volume of water and foaming agent residue is then disposed of. Preferably, the mixture of foam, entrained cuttings, and liquids removed from the well is passed over a shaker or screen to separate out at least a portion of the cuttings before being placed in the receptacle.

The invention is further illustrated by the following examples which are illustrative of various aspects of the invention and are not intended as limiting the scope of the invention as defined by the appended claims.

EXAMPLES 1–9

A series of tests are conducted to determine the foaming ability and foam stability of various concentrations of a mixture of 1 part by weight of sodium 2-(N-lauryl) ethyl sulfate and 3 parts by weight of sodium laurate in water. In one series of tests no contaminants are added to the foam solution. In another series of tests, the aqueous fluid constituent of the foam is contaminated with 5 pounds per barrel kerosene. In still another series of tests, the aqueous fluid constituent of the foam is contaminated with 3 percent by weight sodium chloride.

Twenty five milliliter aliquots of each foaming agent solution are placed in separate vertically positioned glass tubes having a diameter of 2.54 centimeters, a length of 120 centimeters and equipped with a frittered disc at the bottom. Air is forced through the frittered disc at a constant rate until each solution is totally foamed. The total height of the foam is then determined as a measure of the foaming ability of each solution. Then the half-life of each foam is determined as a measure of the foam's initial stability. The half-life is defined as the time required for the foam to break to one-half of its original height. In measuring the half-life, if the foam has not broken to one-half of its original height by the end of two hours, a half-life in excess of 2 hours is indicated. The above tests are made at room temperature. The results are reported in the Table.

Next, 25 milliliters of each solution are placed in a high-temperature bomb and heated for three hours at 200° F. After heating, the solutions are cooled to room temperature and the foaming ability and foam stability of each solution again determined as described above. This test is designed to measure the effect of high temperature upon the foaming ability and foam stability of the foaming agent mixture. The results are also reported in the Table.

TABLE

| Example | Concentration of Foaming Agent Composition (percent by weight) | Contaminant | With No Heating Foam Height (millimeters) | Foam Half Life (Hours) | After Heating Foam Height (Millimeters) | Foam Half Life (Hours) |
|---|---|---|---|---|---|---|
| 1 | 0.033 | None | 60 | 2+ | 64 | 2+ |
| 2 | 0.165 | " | 50 | 2+ | 54 | 2+ |
| 3 | 0.33 | " | 49 | 2+ | 66 | 2+ |
| 4 | 0.033 | Kerosene | 75 | 0.31 | 51 | 0.3 |
| 5 | 0.165 | " | 60 | 0.35 | 49 | 0.3 |
| 6 | 0.33 | " | 43 | 0.80 | 53 | 0.2 |
| 7 | 0.033 | Sodium Chloride | 61 | 2+ | 43 | 2+ |
| 8 | 0.165 | " | 58 | 2+ | 49 | 2+ |
| 9 | 0.33 | " | 51 | 2+ | 54 | 2+ |

The results of these tests indicate that the foaming agent mixture has good foaming ability and that the foam is sufficiently stable for use as a drilling fluid, even in drilling high temperature reservoirs.

EXAMPLE 10

A bore hole 8-¾ inches in diameter is being drilled with a 4-inch drill pipe at 6,000 feet into a subterranean reservoir having a bottom hole temperature of about 200° F. and a bottom hole reservoir pressure of about 400 p.s.i.g. Because the bottom hole reservoir pressure is far below the hydrostatic pressure at that depth, the use of conventional dense drilling mud is precluded. Because of the accumulation of water in the bore hole, the use of air or gas as the sole drilling fluid would not be effective in removing the water and debris from the bottom of the bore hole.

At the surface, 39.5 gallons per minute of an aqueous solution containing 0.08 percent by weight of sodium 2-(N-lauryl) ethyl sulfate and 0.25 percent by weight of sodium laurate and 3,600 standard cubic feet per minute of air are simultaneously injected into the drill pipe at an elevated pressure of about 700 p.s.i.g. The two fluids mix as they travel down the drill pipe together, and emerge from the drill bit producing a foam. When the foam emerges from the drill bit, it is at a temperature of about 200° F. and a pressure of about 400 p.s.i.g. At these bottom hole conditions, the foam contains about 96 volume percent of air and 4 volume percent of foaming solution. The foam carries away accumulated liquids and drill cuttings from the bottom of the bore hole and travels up the bore hole annulus at a velocity of about 400 feet per minute. At the surface, the mixture of foam and entrained materials is passed into a mud pit and allowed to stand. After about 10 days, the foam has biodegraded and is about 90 percent by volume broken leaving behind a relatively small volume of the aqueous solution used to generate the foam, the cuttings and liquid removed from the well.

Various embodiments and modifications of this invention have been described in the foregoing description, and further modifications will be apparent to those skilled in the art. Such modifications are included within the scope of this invention as defined by the following claims.

Having now described the invention, we claim:

1. In the method of conducting foam drilling and workover operations in a bore hole penetrating a subterranean reservoir, wherein foam is generated by contacting an aqueous solution of a foaming agent with a gas, and said foam is caused to flow upwardly through the bore hole to carry solid and liquid materials out of the bore hole, the improvement which comprises using as said foaming agent a mixture comprising:

about 0.1 to 1 part by weight of a foaming agent characterized by the formula:

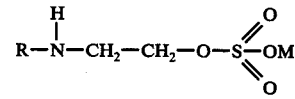

wherein R is a straight chain alkyl radical having 10 to 16 carbon atoms and M is alkali metal or ammonium cation, per part by weight of a foaming agent characterized by the formula:

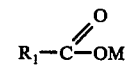

wherein $R_1$ is a straight chain alkyl radical having 9 to 15 carbon atoms and $M_1$ is an alkali metal or ammonium cation.

2. The method defined in claim 1 wherein R and $R_1$ are n-dodecyl groups.

3. The method defined in claim 1 wherein said aqueous solution of said foaming agent contains about 0.016 to 2.5 percent by weight of said foaming agent mixture.

4. The method defined in claim 1 wherein said aqueous solution contains 0.03 to 0.5 percent by weight of said foaming agent mixture.

5. The method defined in claim 1 wherein said foaming agent mixture contains sodium 2-(N-lauryl) ethyl sulfate and sodium laurate.

6. The method defined in claim 1 wherein said foam is subsequently removed from the bore hole, placed in a receptacle and allowed to biodegrade.

7. The method defined in claim 6 wherein said receptacle is a mud pit.

8. A method of conducting foam drilling and workover operations in a bore hole penetrating a subterranean reservoir comprising:
(a) circulating through the bore hole a foam comprising:
(1) about 90 to 99.5 percent by volume of a gas, and
(2) about 0.5 to 10 percent by volume of an aqueous foaming composition comprising:
(A) about 0.016 to 2.5 percent by weight of a foaming agent composition comprising:
about 0.1 to 1 part by weight of a foaming agent characterized by the formula:

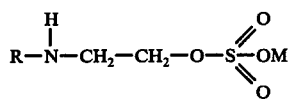

wherein R is a straight chain alkyl radical having 10 to 16 carbon atoms and M is an alkali metal or ammonium cation, per part by weight of a foaming agent characterized by the formula:

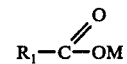

wherein $R_1$ is a straight chain alkyl radical having 9 to 15 carbon atoms and $M_1$ is an alkali metal or ammonium cation,
(B) about 97.5 to 99.984 percent by weight water whereupon the foam entrains cuttings and reservoir liquids,
(b) removing from the bore hole the mixture of foam, cuttings and reservoir liquids,
(c) separating at least a portion of the cuttings from the said mixture,
(d) passing the remaining mixture of foam, remaining cuttings, if any, and reservoir liquids into a receptacle, and
(e) retaining the said remaining mixture in the receptacle for a length of time sufficient for the foaming agent to biodegrade.

9. The method defined in claim 8 wherein R and $R_1$ are n-dodecyl groups.

10. The method defined in claim 8 wherein said aqueous solution contains 0.03 to 0.5 percent by weight of said foaming agent composition.

11. The method defined in claim 8 wherein said foaming agent composition contains sodium 2-(N-lauryl) ethyl sulfate and sodium laurate.

12. The method defined in claim 8 wherein said receptacle is a mud pit.

* * * * *